United States Patent
Berman et al.

[11] Patent Number: 6,002,549
[45] Date of Patent: Dec. 14, 1999

[54] DITHER MICROACTORS FOR STICTION RELEASE IN MAGNETIC DISC DRIVES

[75] Inventors: Alan David Berman, Thousand Oaks; Khosrow Mohajerani, Newbury Park; Anoush Mahabadi Fard, Agoura Hills; Joseph Michael Sampietro, Tarzana, all of Calif.; Zine-Eddine Boutaghou, Vadnais Heights, Minn.

[73] Assignee: Seagate Technology, Inc., Scotts Valley, Calif.

[21] Appl. No.: 08/866,984

[22] Filed: Jun. 2, 1997

Related U.S. Application Data

[62] Continuation-in-part of application No. 08/836,292, filed as application No. PCT/US97/07892, May 12, 1997, and a continuation-in-part of application No. 08/836,466, filed as application No. PCT/US97/07710, May 5, 1997, and a continuation-in-part of application No. 08/852,087, May 7, 1997.

[60] Provisional application No. 60/030,406, Nov. 1, 1996, provisional application No. 60/030,276, Nov. 4, 1996, provisional application No. 60/032,348, Dec. 4, 1996, and provisional application No. 60/031,578, Dec. 5, 1996.

[51] Int. Cl.$^6$ ............................ G11B 21/12; G11B 21/10
[52] U.S. Cl. ............................ 360/104; 360/75; 360/109
[58] Field of Search ................................. 360/75, 97.01, 360/103, 104, 106, 109

[56] References Cited

U.S. PATENT DOCUMENTS

| | | | |
|---|---|---|---|
| 4,530,021 | 7/1985 | Cameron | 360/106 X |
| 4,620,251 | 10/1986 | Gitzendanner | 360/103 |
| 4,897,743 | 1/1990 | Kohno | 360/75 |
| 4,962,391 | 10/1990 | Kitahara et al. | 346/140 R |

(List continued on next page.)

FOREIGN PATENT DOCUMENTS

| | | |
|---|---|---|
| 1-107382 | 4/1989 | Japan . |
| 1-134769 | 5/1989 | Japan . |
| 1-143067 | 6/1989 | Japan . |
| 1-146175 | 6/1989 | Japan . |

(List continued on next page.)

OTHER PUBLICATIONS

"A Flexural Piggyback Milli–Actuator for Over 5 Gbit/in.$^2$ Density Magnetic Recording" by Koganezawa et al., *IEEE Transactions on Magnetics*, vol. 32, No. 5, Sep.1996.

"Transverse Mode Electrostatic Microactuator for Mems–Based HDD Slider" by Imamura et al., 0–7803–2985–6/96, IEEE 1996.

An Experiment for Head Positioning System Using Submicron Track–width GM Head by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al., *Advances in Information Storage Systems*, vol. 5, 1993 American Society of Mechanical Engineers.

"A Dual–Stage Magnetic Disk Drive Actuator Using a Piezoelectric Device for a High Track Density" by Munemoto et al., *IEEE Transactions on Magnetics*, vol. 27, No. 6, Nov. 1991.

"Dynamic Loading Criteria for 3–½ inch Inline HDD Using Multilayer Piezoelectric Load/Unload Mechanism" by Kajitani et al., *IEEE Transactions on Magnetics*, vol. 27, No. 6, Nov. 1991.

*Primary Examiner*—William J. Klimowicz
*Attorney, Agent, or Firm*—Kinney & Lange, P.A.

[57] ABSTRACT

A disc drive has rotatable recording disc and a transducing head on a slider arranged to fly over a surface of the disc when the disc is rotated. The slider is supported by an actuator arm operatively coupled to an actuator motor to position the transducing head over a selected track of the disc. The slider is arranged to land on the disc surface when the disc is not rotated. Dithering means vibrates the slider when the slider is on the disc surface to reduce stiction between the slider and the disc surface thereby reducing the torque required to commence flying of the slider.

32 Claims, 10 Drawing Sheets

U.S. PATENT DOCUMENTS

| | | | |
|---|---|---|---|
| 5,034,828 | 7/1991 | Ananth et al. | 360/75 |
| 5,065,268 | 11/1991 | Hagen | 360/104 |
| 5,067,037 | 11/1991 | Ananth et al. | 360/103 |
| 5,072,240 | 12/1991 | Miyazawa et al. | 346/140 R |
| 5,079,659 | 1/1992 | Hagen | 360/104 |
| 5,105,408 | 4/1992 | Lee et al. | 369/44.15 |
| 5,189,578 | 2/1993 | Mori et al. | 360/106 |
| 5,255,016 | 10/1993 | Usui et al. | 346/140 R |
| 5,313,352 | 5/1994 | Chikazawa et al. | 360/103 |
| 5,384,675 | 1/1995 | Crawforth et al. | 360/75 |
| 5,521,778 | 5/1996 | Boutaghou et al. | 360/106 |
| 5,530,602 | 6/1996 | Boutaghou et al. | 360/75 |
| 5,552,809 | 9/1996 | Hosono et al. | 347/10 |
| 5,719,720 | 2/1998 | Lee | 360/71 |

FOREIGN PATENT DOCUMENTS

| | | |
|---|---|---|
| 62-071075 | 4/1987 | Japan . |
| 2-050369 | 2/1990 | Japan . |
| 2-227886 | 9/1990 | Japan . |
| 3-003179 | 1/1991 | Japan . |
| 4-017143 | 1/1992 | Japan . |
| 6-020415 | 1/1994 | Japan . |
| 9-091908 | 4/1997 | Japan . |

DITHER MICROACTORS FOR STICTION RELEASE IN MAGNETIC DISC DRIVES

CROSS-REFERENCE TO RELATED APPLICATIONS

This application is a continuation-in-part of application No. 08/836,292 filed May 12, 1997, which is a 371 application of PCT/US97/07892 filed May 12, 1997, which claims priority of U.S. Provisional Application No. 60/030,406 filed Nov. 1, 1996. This application is also a continuation-in-part of application No. 08/836,466 filed May 5, 1997, which is a 371 application of PCT/US97/07710 filed May 5, 1997, which in turn claims the benefit of U.S. Provisional Application No. 60/030,276 filed Nov. 4, 1996. This application is also a continuation-in-part of application No. 08/852,087 filed May 7, 1997, which claims the benefit of U.S. Provisional Application No. 60/032,348 filed Dec. 4, 1996, and also claims the benefit of U.S. Provisional No. 60/031,578 filed Dec. 5, 1996. All of the applications are assigned to the same assignee as the present application.

BACKGROUND OF THE INVENTION

This invention relates to stiction reduction in a magnetic disc drive, and particularly to the use of microvibration in an actuator arm of a disc drive to reduce stiction.

In magnetic disc drives, the transducing head is ordinarily carried on a slider having an air bearing surface that permits the slider to "fly" a small distance over the disc surface. The slider, which is supported by a gimbal spring, which in turn is attached to an actuator arm, is permitted to "land" on the disc surface when the disc drive is inactive. Hence, when the disc is not rotating, the slider "lands" on the surface, usually at a landing or parking zone dedicated to that purpose. When the disc drive is rotated at its operational velocity, the spinning disc creates windage, causing the slider to "fly" a small distance above the disc surface. The air bearing surface of the slider and the surface of the disc are ultra smooth, enabling the slider to fly the transducing head only a few microinches or less above the disc surface.

However, a problem arises when the slider has landed on the disc. Stiction between the ultra smooth disc surface and ultra smooth air bearing surface of the slider inhibits the startup of rotation of the disc, requiring a significant amount of torque in the disc spindle motor to overcome. Stiction is the result of the adherence of the slider to the disc and is aggravated by the adhering qualities of lubricants and contaminants on the disc surface causing the slider to "stick" to the disc surface. Numerous techniques are employed in disc drives to reduce the problem of stiction. For example, it is common to provide the landing or parking zone of the disc surface with a textured or rough surface to admit air under the slider so that the air bearing surface of the slider is not in full contact with the disc surface. Another technique is to operate the voice coil motor associated with the actuator arm to move the slider radially with respect to the landing zone on the disc simultaneously with operation of the spindle motor to rotate the disc relative to the slider.

There is a need to increase data capacity on discs by increasing the density of data recorded along a track of a disc and by decreasing the spacing of concentric tracks to thereby increase the number of tracks on the disc. The increase in data capacity results in the need for even smoother discs and air bearing sliders to permit the head to fly even closer to the disc surface, as well as increased precision of the speed of the motors driving the disc spindle and the actuator arm. However, increased smoothness presents the risk of increasing stiction, and increased speed precision of the motors can only be accomplished at a sacrifice of torque, which is needed to overcome stiction. Hence, a need exists to overcome the effects of stiction without sacrificing smoothness of the disc and air bearing surfaces and without sacrificing speed precision requirements of the motors. As a result, if stiction can be overcome, the spindle motor may be designed for speed, rather than torque.

SUMMARY OF THE INVENTION

According to an embodiment of the present invention, a disc drive has rotatable recording disc and a transducing head on a slider arranged to fly over a surface of the disc when the disc is rotated. The slider is supported by an actuator arm operatively coupled to an actuator motor to position the transducing head over a selected track of the disc. The slider is arranged to land on the disc surface when the disc is not rotated. Dithering means vibrates the slider when the slider is on the disc surface to reduce stiction between the slider and the disc surface thereby reducing the torque required to commence flying of the slider.

In one embodiment, the dithering means includes a piezoelectric element supported on the actuator arm, and a voltage supply operates the piezoelectric element at a design frequency. In another embodiment, the actuator arm includes a space forming first and second arm side portions on opposite sides of a longitudinal axis. In one form of this embodiment, the piezoelectric element is on one side portion of the actuator arm. In another form of this embodiment, an additional piezoelectric element is on the second side portion and is configured complementary to the piezoelectric element in the first side portion.

DETAILED DESCRIPTION OF THE PREFERRED EMBODIMENTS

Figure 1:
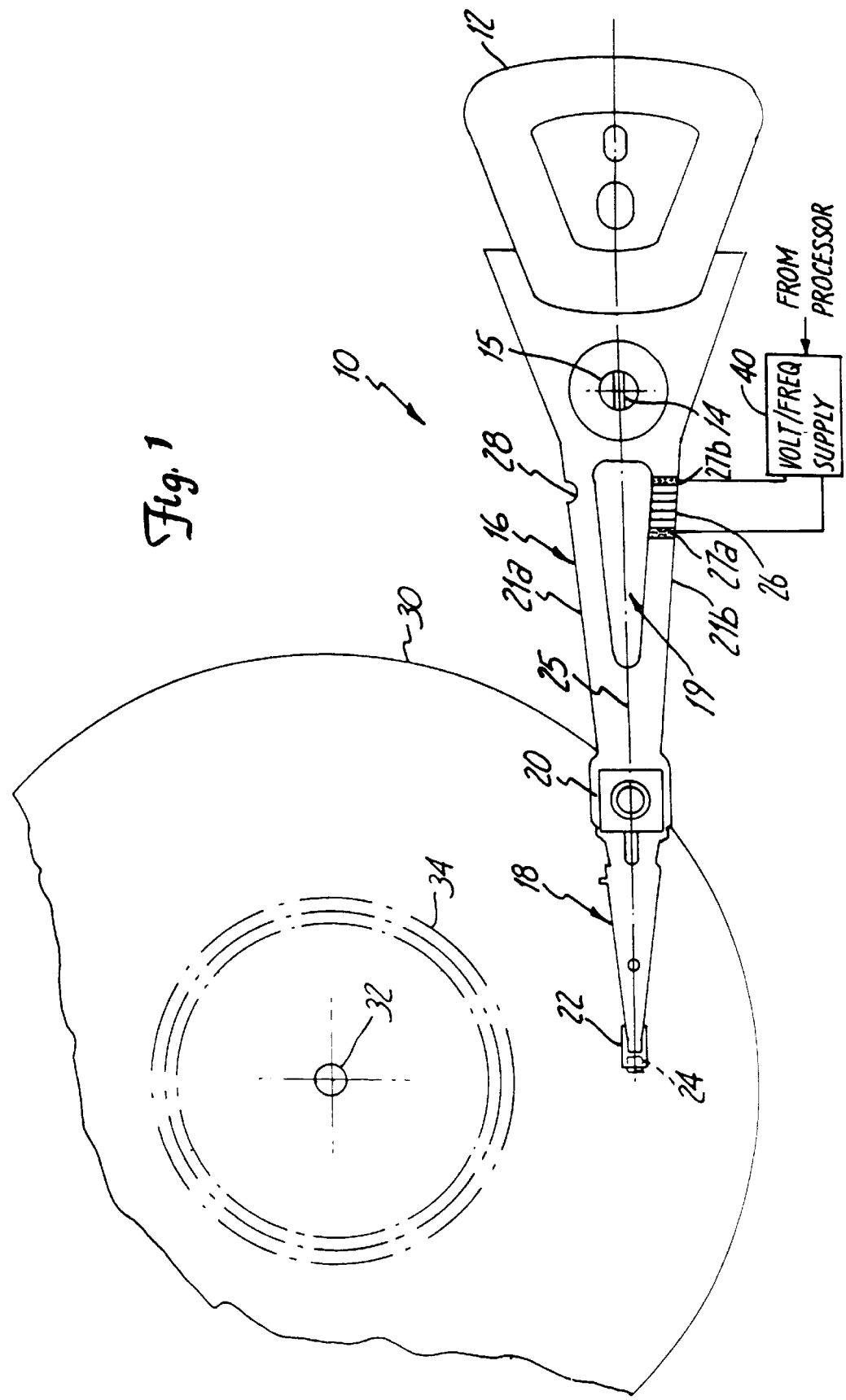
FIG. 1 is a top view of an actuator arm having a dithering unit according to a first embodiment of the present invention.
Figure 2:
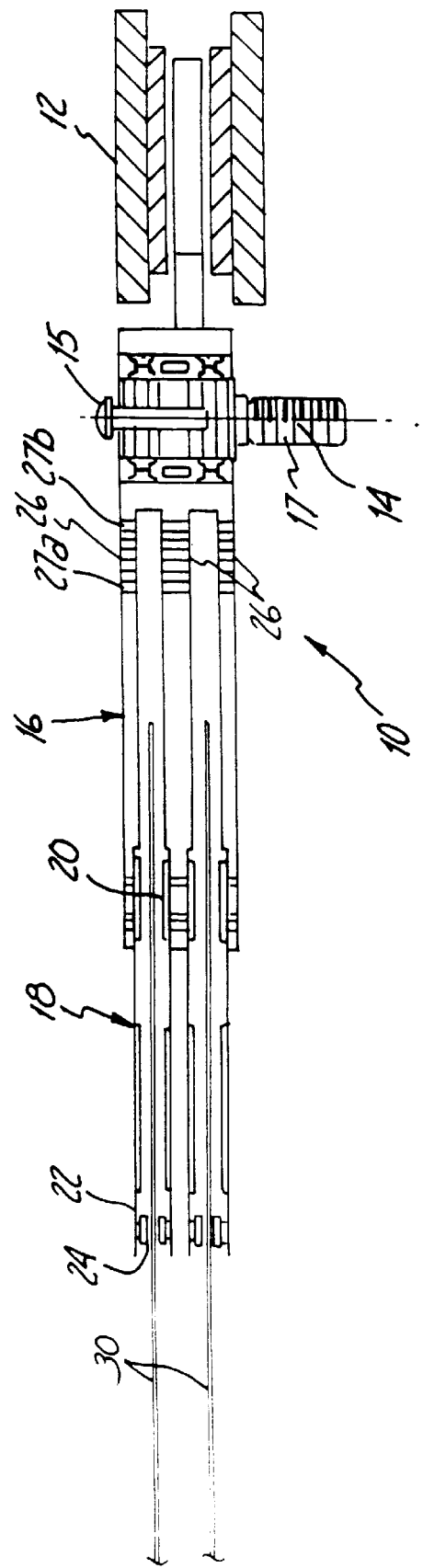
FIG. 2 is a side view of the actuator arm of FIG. 1.

FIG. 1 is a top view, and FIG. 2 is a side view, of an actuator arm assembly employing a dithering unit according to a first embodiment of the present invention. A voice coil motor 12 is operable to rotate actuator arms 16 of an E-block about axis 14 of spindle 17. Threaded fastener 15 fastens the hub of actuator arms 16 to actuator arm spindle 17. Load beam 18 is connected to a distal end of actuator arm 16 by load beam mounting block 20. Gimbal 22 is attached to a distal end of head suspension 18. Slider 24 is mounted to gimbal 22 in a manner known in the art. Voice coil motor 12 is operatively attached to the E-block for rotating actuator arms 16 of the E-block to position slider 24 adjacent a selected track 34 on disc 30. Each actuator arm 16 is rotatable around axis 14 in response to operation of voice coil motor 12, and has a longitudinal axis 25 normal to axis 14. Each actuator arm 16 includes a space 19 forming arm side portions 21a and 21b on each side of longitudinal axis 25. Voice coil motor 12, actuator arms 16, load beam 18, load beam mounting block 20, gimbal 22, and slider 24 are all standard disc drive system components, manufactured in a manner known in the art.

The dithering unit to vibrate or dither the slider includes piezoelectric element 26 is embedded in side portion 21b of actuator arm 16, which expands and contracts in response to a voltage applied to its terminals 27a and 27b. As described in the aforementioned Mohajerani et al. application, piezoelectric element 26 comprises a stack of piezoelectric layers, the size of each of which is varied in proportion to the voltage across its terminals 27a and 27b. Relief 28 is provided in side portion 21a of actuator arm 16, to reduce the force required to distort actuator arm 16 by selective expansion and contraction of piezoelectric element 26. Piezoelectric element 26 is a microactuator motor designed to induce a small movement to the slider without use of the voice coil motor. Other microactuator motors could be employed in place of piezoelectric element 26, including motors operating on electromagnetic, electrostatic, capacitive, fluidic and thermal principles.

As shown particularly in FIG. 1, a power supply 40 provides a voltage to terminals 27a and 27b to selectively operate piezoelectric element 26. In one preferred form of the invention, power source 40 provides a voltage of between ±5 volts varying at a frequency between about 1 and 30,000 Hz. The ±5 volt input provides expansion/contraction of approximately 3.05 µm in piezoelectric element 26 at the frequency of supply 40. Preferably, the frequency of supply 40 is selected such that resonance is established at the slider 24.

With the disc stopped and the slider landed, or parked, operation of the disc drive is commenced by operating piezoelectric element 26 at the selected frequency to vibrate actuator arm 16, thereby inducing reciprocal movement or dither in slider 24 radially across the track or region on which the slider has landed. Alternatively, or in addition, vibration of the actuator arm may induce vibration in the slider normal to the disc surface. The vibration induced in slider 24 reduces stiction between the slider and the disc, thereby reducing the amount of torque necessary to achieve operation of the disc drive. At the same time as the piezoelectric element 26 is operated to dither the slider, spindle motor 32 is operated to rotate disc 30 around the spindle axis 32. Dithering the slider with respect to the disc reduces stiction between the disc and the slider, thereby reducing the torque necessary to overcome stiction and reducing wear of the head and disc surface interface.

Voice coil motor 12 may thereafter be operated to rotate actuator arm 16 around axis 14 to effect positioning of slider 24 over a selected region of a rotatable disc 30.

As described in the aforementioned Mohajerani et al. application, piezoelectric element 26 may also be employed for fine positioning of slider 24 relative to tracks 34 on disc 30, in which case the piezoelectric element is preferably positioned as near to rotational axis 14 of actuator arm 16 as possible, and as near to longitudinal axis 25 of actuator arm 16 as possible. A voltage applied to piezoelectric element 26 causes selective expansion or contraction of the piezoelectric element, thereby causing distortion of actuator arm 16 to effect fine positioning of slider 24 over a selected track of rotatable disc 30. As explained in the Mohajerani et al. application, the arc of fine positioning of slider 24 by expansion and contraction of piezoelectric element 26 approximates the designed head positioning arc as nearly as possible, thereby minimizing head skew and maximizing the displacement of slider 24 for a corresponding expansion or contraction of piezoelectric element 26.

Tables I, II and III illustrate the effect of the dithering device of the present invention. A first ST52520 disc drive manufactured by Seagate Technology, Inc. of Scotts Valley, Calif., was configured with a single piezoelectric device 26 in each actuator arm in accordance with the embodiment of FIG. 1. The drive employed three arms arranged so that two arms each carried one slider assembly and the third (middle) arm carried two slider assemblies; each of the four sliders being arranged to confront a respective disc surface of two discs. Each disc included a textured landing zone at an inner location between about 0.65 and 0.8 inches radius of the disc, the texturing being designed to minimize stiction between the slider and the disc. Various voltage signals were applied to the piezoelectric elements while the slider was landed on the disc surface. The disc motor was operated to rotate the disc and the amount of torque required to overcome the effects of stiction between the slider and the disc was measured.

In a first series of tests, the static stiction (that is, the stiction without any vibration actuation according to the present invention) at the landing zone was measured by permitting the slider to rest in contact with the landing zone of the disc surface for a period of 30 minutes. The spindle motor was operated, without applying any signal to the piezoelectric element, to overcome stiction between the disc and the slider and achieve rotation of the disc. The torque required to achieve operational rotation of the disc was 0.22 in-oz. The slider was then landed in the landing zone and an alternating signal of ±5 volts was applied to the piezoelectric element 26 at various frequencies and after various durations of rest in the landing zone. The torque required to overcome stiction and achieve rotation of the disc was recorded and is tabulated in Table I.

TABLE I

| Time At Rest | Piezo Frequency (Hz) | Stiction Torque (in-oz) |
| --- | --- | --- |
| 30 minutes | 197 | 0.15 |
| 30 minutes | 800 | 0.15 |
| 30 minutes | 1100 | 0.15 |
| 30 minutes | 1100 | 0.15 |
| 30 minutes | 2500 | 0.14 |
| 30 minutes | 124 | 0.15 |
| 0 | 65 | 0.15 |
| 30 minutes | 100 | 0.15 |
| 0 | 30 | 0.15 |
| 30 minutes | 1100 | 0.14 |
| 30 minutes | 27 | 0.15 |
| 30 minutes | 164 | 0.15 |

In a second series of tests, the static stiction at the data zone was measured by permitting the slider to rest in contact with the data zone of the disc surface for a period of 30 minutes at a radius of 1.25 inches on the disc surface. The spindle motor was operated, without applying any signal to the piezoelectric element, to overcome stiction between the disc and the slider and achieve rotation of the disc. The torque required to achieve operational rotation of the disc was 0.35 in-oz. The slider was then landed in the data zone at a radius of about 1.25 inches on the disc and an alternating signal of ±5 volts was applied to the piezoelectric element 26 at various frequencies and after various durations of rest in the landing zone. The torque required to overcome stiction and achieve rotation of the disc was recorded and is tabulated in Table II.

TABLE II

| Time At Rest | Piezo Frequency (Hz) | Stiction Torque (in-oz) |
| --- | --- | --- |
| 0 | 325 | 0.20 |
| 0 | 500 | 0.20 |
| 0 | 1000 | 0.15 |

In a third series of tests, the static stiction at an outside radius of the data zone was measured by permitting the slider to rest in contact with the disc surface for a period of 30 minutes at a radius of 1.80 inches. The spindle motor was operated, without applying any signal to the piezoelectric element, to overcome stiction between the disc and the slider and achieve rotation of the disc. The torque required to achieve operational rotation of the disc was 0.75 in-oz. The slider was then landed in the data zone at a radius of about 1.80 inches on the disc and an alternating signal of ±5 volts was applied to the piezoelectric element 26 at various frequencies and after various durations of rest in the landing zone. The torque required to overcome stiction and achieve rotation of the disc was recorded and is tabulated in Table III.

TABLE III

| Time At Rest | Piezo Frequency (Hz) | Stiction Torque (in-oz) |
| --- | --- | --- |
| 0 | 664 | 0.30 |
| 8 hours | 2200 | 0.15 |

A second ST52520 disc drive manufactured by Seagate Technology, Inc. of Scotts Valley, Calif., was configured as described above with a single piezoelectric device 26 in each actuator arm in accordance with the embodiment of FIG. 1. Static stiction was measured, as described above, for four conditions: With no sliders (no sliders in contact with the disc surfaces to thereby measure the torque necessary to achieve operational rotation of the spindle motor due solely to the motor) the torque required to achieve operational rotation of the spindle motor was 0.13 in-oz. With the heads landed at the landing zone, the torque required to achieve operational rotation of the spindle motor was 0.33 in-oz. With the heads landed in the middle of the data zone at a radius of 1.25 inches, the torque required to achieve operational rotation of the spindle motor was 0.70 in-oz. With the heads landed at the outer radius of the data zone at a radius of 1.80 inches, the torque required to achieve operational rotation of the spindle motor was 0.90 in-oz. The slider was then landed at each of the three locations and an alternating signal of ±5 volts was applied to the piezoelectric elements at various frequencies. The torque required to overcome stiction and achieve operational rotation of the discs was recorded and is tabulated in Table IV.

TABLE IV

| Zone | Piezo Frequency (Hz) | Stiction Torque (in-oz) |
| --- | --- | --- |
| Landing | 320 | 0.160 |
| Landing | 370 | 0.180 |
| Landing | 440 | 0.200 |
| Mid data | 1100 | 0.225 |
| Mid data | 1200 | 0.250 |
| Mid data | 1300 | 0.240 |
| Outer radius | 1200 | 0.225 |
| Outer radius | 1300 | 0.250 |
| Outer radius | 1500 | 0.225 |

Figure 3:
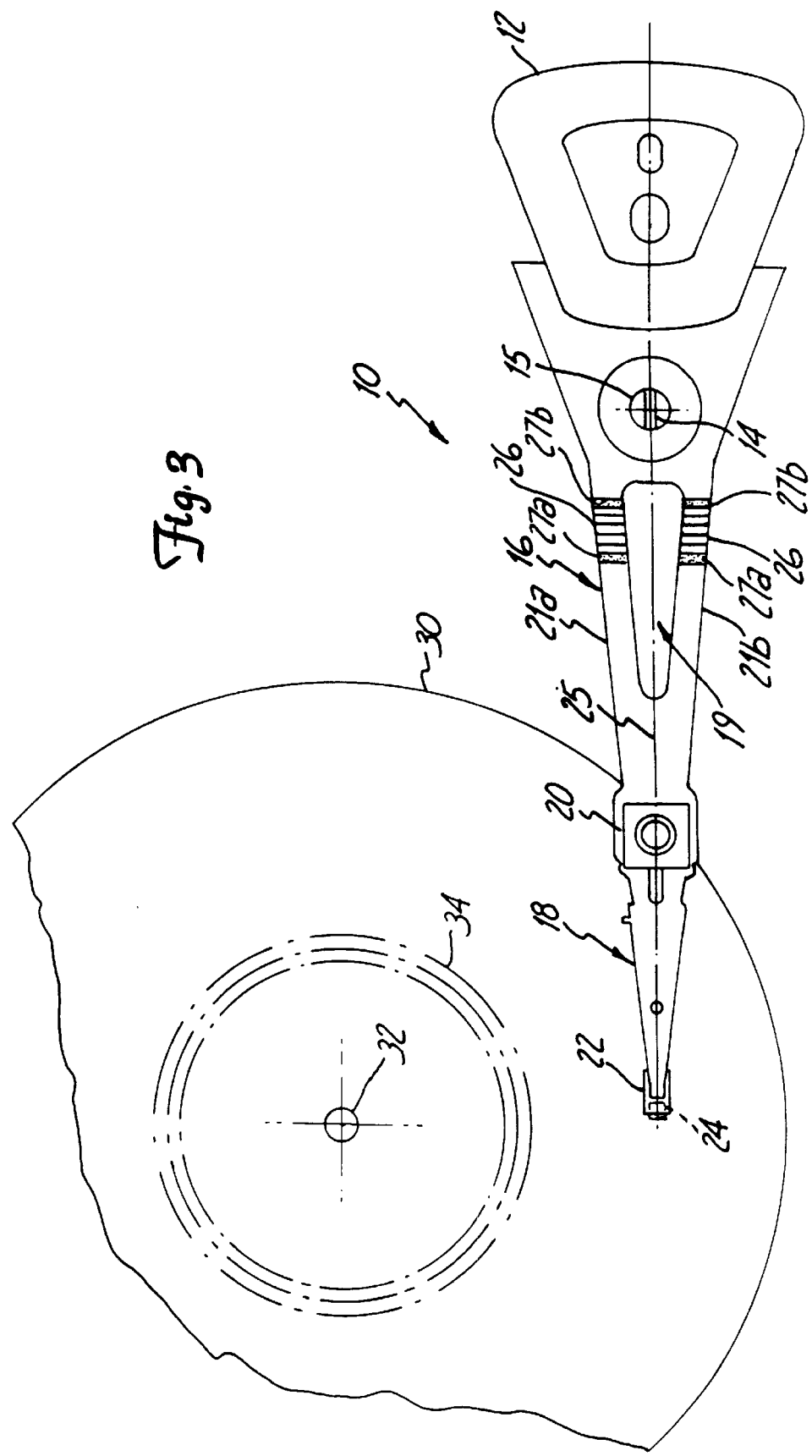
FIG. 3 is a top view of an actuator arm having a dithering unit according to a second embodiment of the present invention.

FIG. 3 is a top view of an alternative embodiment of an actuator arm and dithering unit of the present invention. The principal difference between the actuator arm shown in FIGS. 1 and 2 and that shown in FIG. 3 is the inclusion of a second piezoelectric element 26 embedded in the side portion 21a opposite the piezoelectric element 26 in side portion 21b of actuator arm 16. The two piezoelectric elements may be implemented with opposite polarities so that a voltage introduced across terminals 27a and 27b of both piezoelectric elements induces expansion of one side portion of actuator arm 16 and simultaneous contraction of the other side portion of actuator arm 16. This complementary arrangement of piezoelectric elements 26 allows a greater vibration of actuator arm 16 to be achieved.

Figure 4:
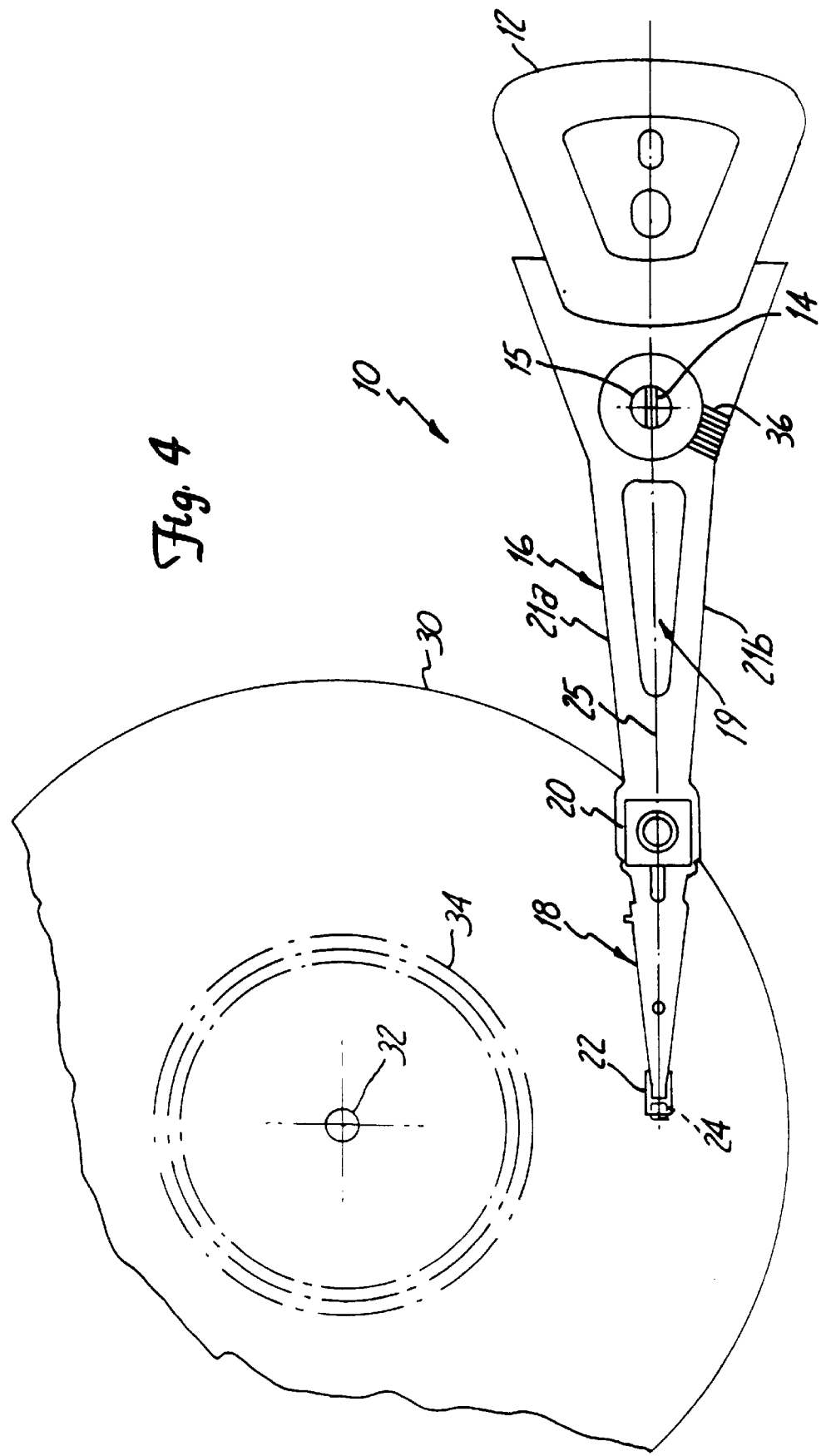
FIG. 4 is a top view of an actuator arm having a dithering unit according to a third embodiment of the present invention.

FIG. 4 is a top view of another embodiment of an actuator arm and dithering unit of the present invention. In FIG. 4 piezoelectric element 36a is positioned in the hub of the E-block to vibrate the actuator arms 16 in a direction about the axis 14 of actuator arm spindle 17. (FIG. 2)

Figure 5:
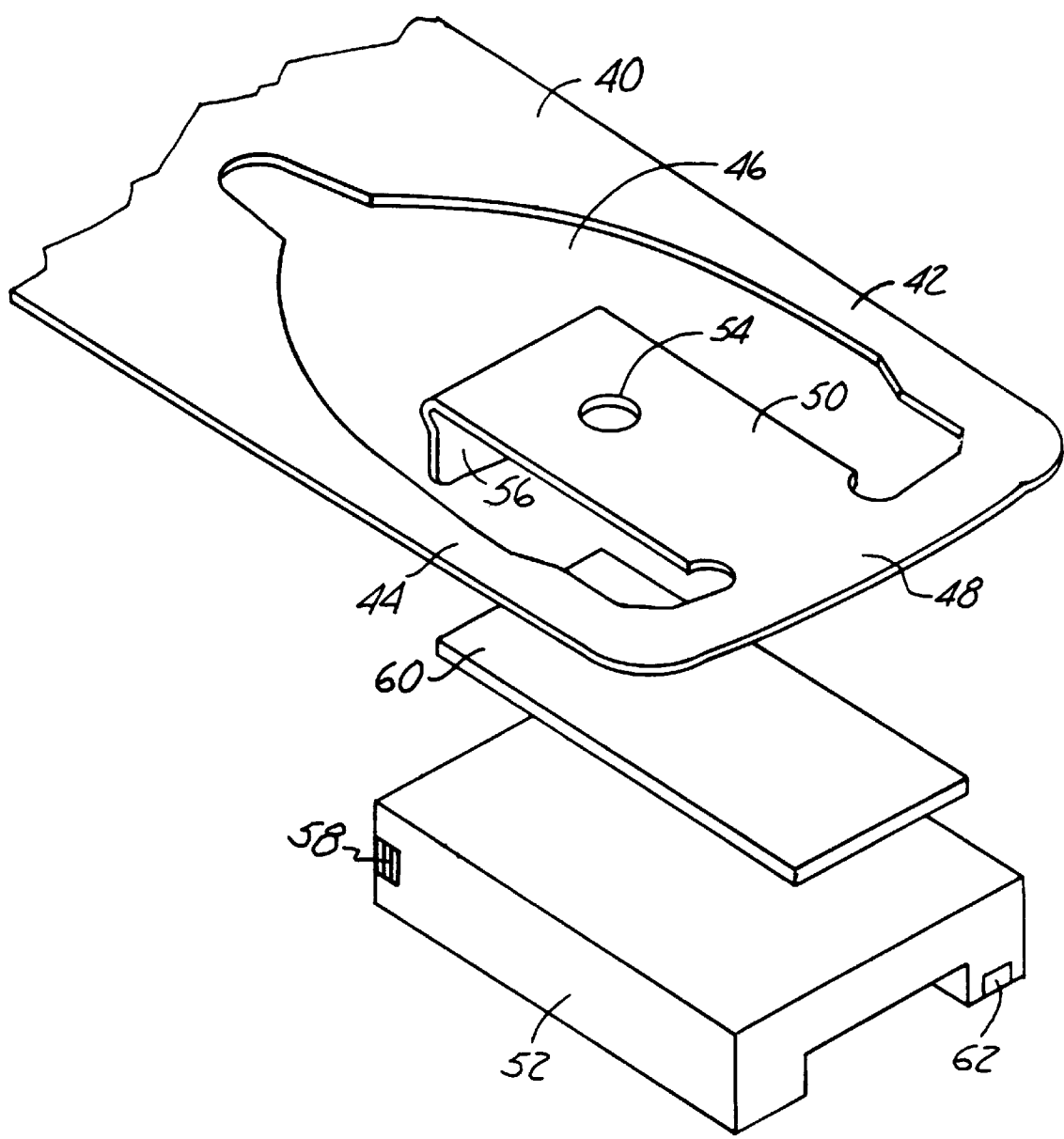
FIG. 5 is a perspective view of a gimbal/slider system having a dithering unit according to a fourth embodiment of the present invention.

FIG. 5 is a perspective view of a portion of another alternative embodiment of a dithering unit of the present invention, employing a gimbal/slider system as more particularly described in the aforementioned Boutaghou et al. application. Gimbal or flexure 40 mounted to the underside of a distal end of a load beam, such as load beam 18 in FIG. 1. Gimbal 40 includes arms 42 and 44 forming aperture 46 therebetween to provide resilience or spring flexure to gimbal or flexure 40. The distal ends of arms 42 and 44 are connected to a distal cross member 48. Central tongue 50 extends from cross member 48 into the space of aperture 46 generally coplanar with flexure arms 42 and 44. Tongue 50 extends beyond the leading edge surface of slider 52 and includes aperture 54, through which the load beam on actuator arm 18 applies a pre-load force to slider 52. The portion of tongue 48 extending beyond the leading edge surface is bent downward into a right angle to form a tab 56, parallel to the leading edge surface of slider 24, and the leading edge of slider 24 is rigidly attached to tab 56. Microactuator 58 is formed on the leading edge surface of slider 52 to react against tab 56. Optionally a shear layer 60 may be provided between tongue 50 and slider 52 to minimize the wear on slider 52. One or more transducing heads 62 are formed at the trailing edge of the slider. The structure and components of gimbal 40 are described in greater detail in the aforementioned Liu et al. application, which is hereby incorporated herein by reference in its entirety.

Figure 7:
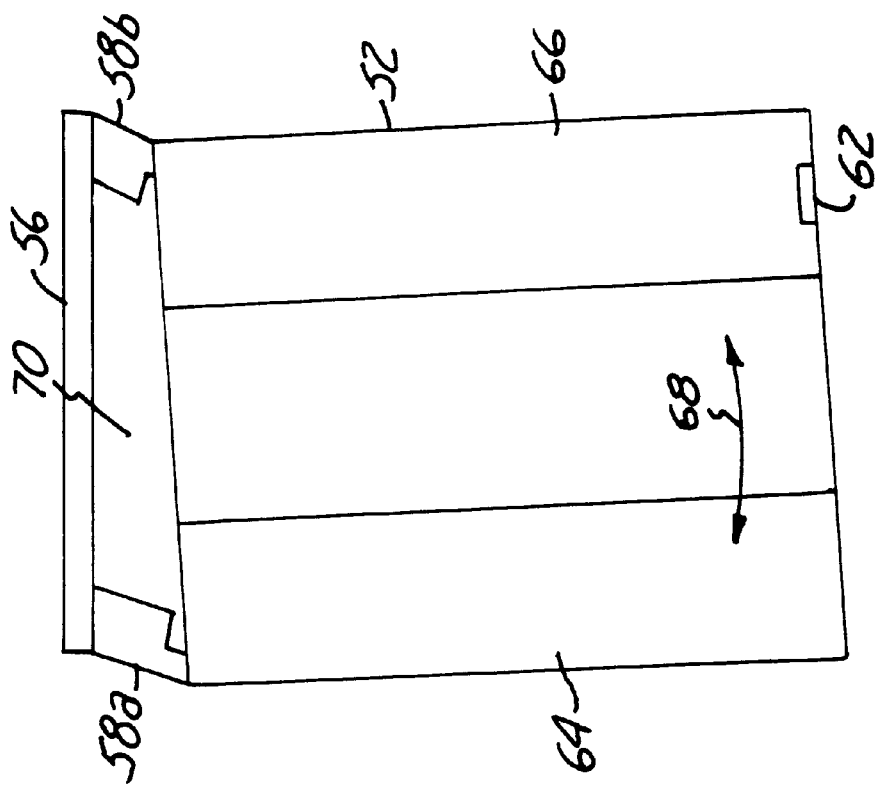
FIGS. 6 and 7 illustrate operation of the gimbal/slider system of FIG. 5.
Figure 6:
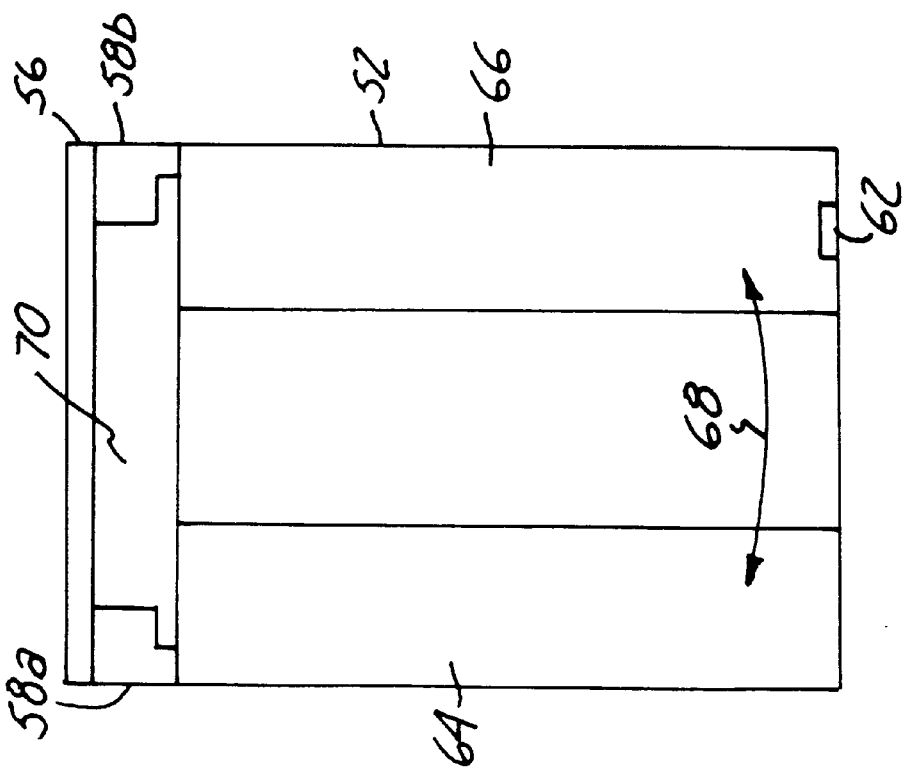

FIGS. 6 and 7 illustrate microactuator 58 on the underside of slider 52 at the leading edges of rails 64 and 66, which together form the air bearing surface of the slider. In the embodiment of FIGS. 6 and 7, two microactuators 58a and 58b are at opposite sides of slider 52 and are attached to the leading edge of the slider and to tab 56. Region 70 of the slider is a compliant material, such as rubber or air. As described in the aforementioned Boutaghou et al. application Ser. No. 08/852,087, microactuator 58a and/or 58b is selectively expanded and contracted to move slider 52 along the arc of arrow 68. Hence, the microactuators 58 operate to provide fine positioning of head 62 with respect to a selected track. Additionally, by driving microactuators 58 with an alternating signal, such as from supply 40 shown in FIG. 1, the microactuator acts as a dithering device and the slider can be vibrated to overcome the effects of stiction, without affecting operation of either the disc spindle motor or the actuator arm voice coil motor. It will be appreciated by those skilled in the art that a single microactuator may be used to vibrate the slider.

Figure 8:
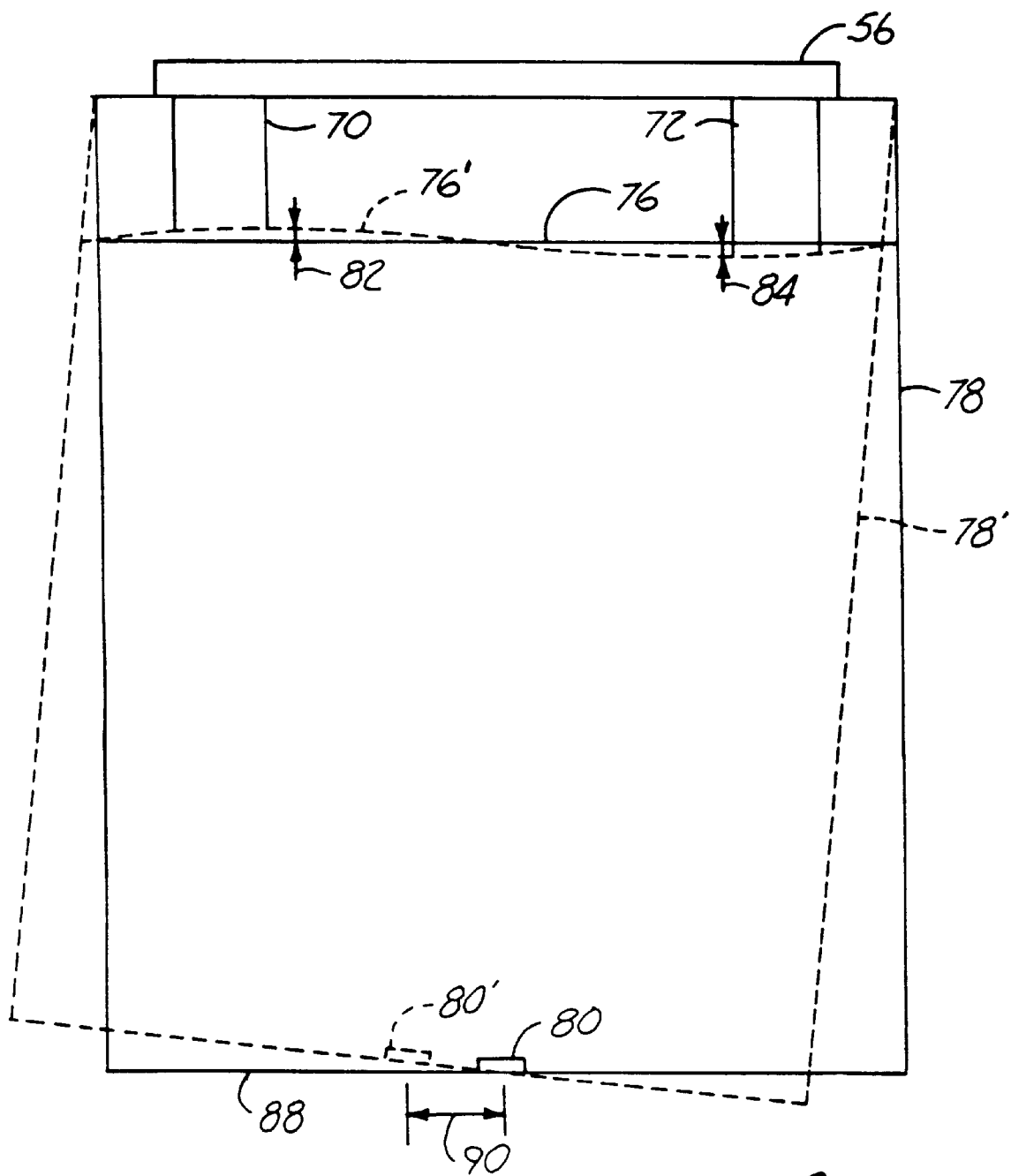
FIG. 8 is a plan view of a gimbal/slider system having a dithering unit according to a fifth embodiment of the present invention.

FIG. 8 illustrates another embodiment, similar to that shown in FIGS. 6 and 7, wherein microactuators 70 and 72 selectively expand and contract against tab 56 (FIG. 6) to deform the leading edge 76 of slider 78 from that shown in solid line 76 to that shown in dashed line 76'. Slider 78 thereby deforms from that shown in solid lines 78 to that shown in dashed lines 78'. As shown in FIG. 8 and more fully described in the aforementioned Boutaghou et al. application Ser. No. 08/852,087, expansion of one microactuator, such as piezoelectric element 72, while contraction of the other microactuator, such as piezoelectric element 70, causes fine movement of the ends of the front edge 76 of slider 78 as shown at 82 and 84 to thereby alter the radial position of head 80 at the trailing edge 86 by a distance as great as shown at 90. By driving microactuators 70 and 72 with an alternating signal, such as from supply 40 shown in FIG. 1, the microactuators act as a dithering device and the slider can be vibrated to overcome the effects of stiction, without affecting operation of either the disc spindle motor or the actuator arm voice coil motor. Again, it will be appreciated by those skilled in the art that a single microactuator may be used to vibrate the slider.

Figure 9:
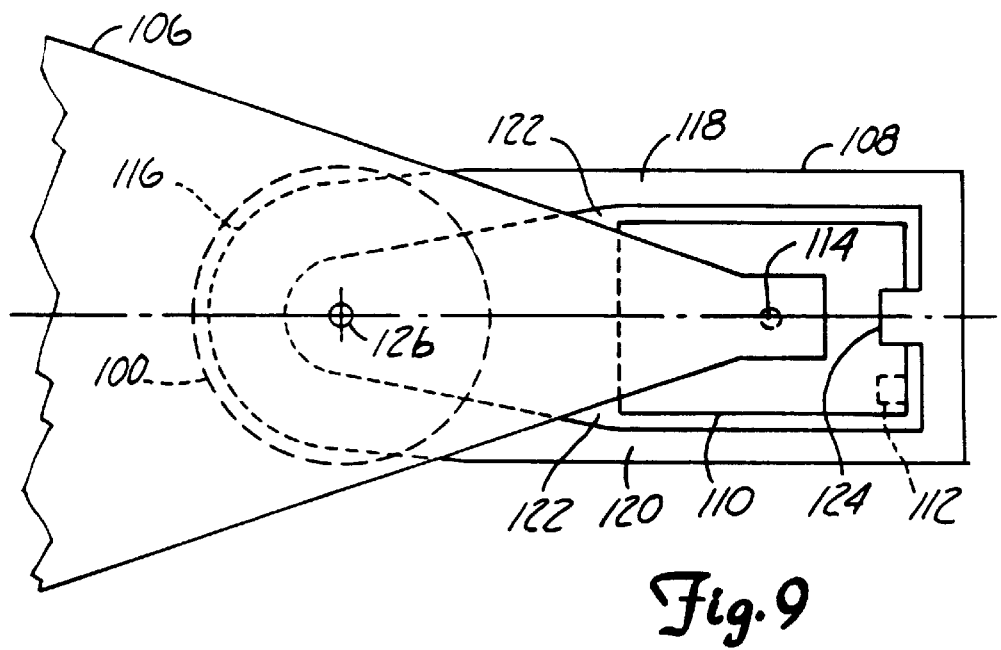
FIGS. 9 and 10 are plan and side views, respectively, of a gimbal/slider system having a dithering unit according to a sixth embodiment of the present invention.
Figure 10:
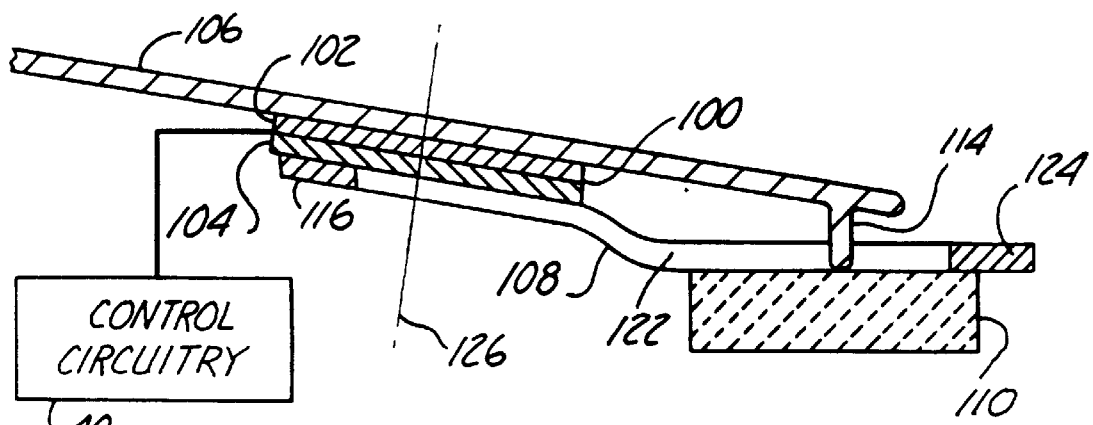

FIGS. 9 and 10 illustrate another embodiment of the present invention employing a rotary motor 100 having stator 102 and rotor 104 attached to and between head suspension load beam 106 and gimbal spring 108, preferably with stator 102 attached to load beam 106 and rotor 104 attached to gimbal 108, for example. Slider 110 carries a transducing head 112 and is mounted to gimbal 108 near a distal end of slider 100. Suspension load beam 106 applies a pre-load force against slider 110 via pre-load tip 114.

Gimbal 108 is shaped with an arcuate end portion 116 at a proximal end, and arm portions 118 and 120 extending toward a distal end, forming an aperture 122 between the arm portions. Slider 110 is attached to tongue portion 124 at a distal end of gimbal 108. Arcuate portion 116 of gimbal 108 is attached to rotor 104 of motor 100, so that movement of rotor 104 causes rotation of gimbal 108 about axis 126.

Because rotary motor 100 is a discrete component separate from the design of load beam 106, gimbal 108 and slider 110, rotary motor 100 can be implemented with any small-scale motor technology. Examples of suitable small-scale motors include piezoelectric, electromagnetic, electrostatic, capacitive, and thermal motors, each of which is known in the art. For example, a piezoelectric micromotor is disclosed by A Flynn et al. in "Piezoelectric Micromotors for Microrobots," 1990 Ultrasonics Symposium, pp. 1163–72, and an electrostatic micromotor is disclosed by D. Horsley et al. in "Angular Micropositioner for Disk Drives," Tenth Annual International Workshop on Micro Electro Mechanical Systems, Nagoya, Japan, Jan. 26–30, 1997. Generally, such micromotors operate via parallel plates attached to a fixed outer ring (stator) and mobile inner ring (rotor) of the motor in opposing pairs. A control signal, such as a voltage, is applied to the pairs of plates to rotate the central rotor with respect to the stator by motion induced in the plates. The design flexibility of the present invention, which permits the use of several existing micromotor designs, greatly simplifies the design of high-resolution head positioning mechanisms for disc drives.

As described in the aforementioned Boutaghou et al application Ser. No. 08/836,466, motor 100 is operated to finely position head 112 with respect to a selected track. Additionally, by driving microactuator 100 with an alternating signal, such as from supply 40 shown in FIG. 1, the microactuator acts as a dithering device and slider 108 can be vibrated to overcome the effects of stiction, without affecting operation of either the disc spindle motor or the actuator arm voice coil motor.

Figure 11:
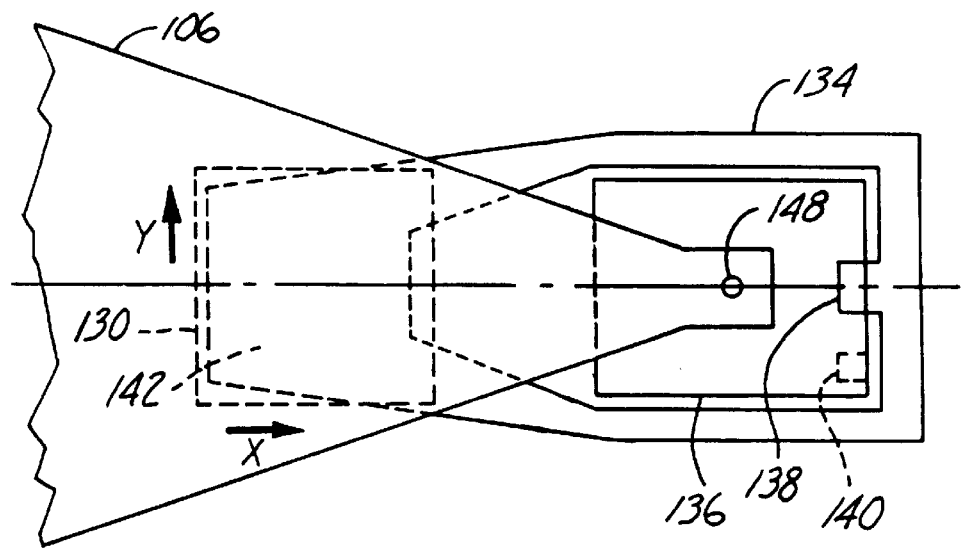
FIGS. 11 and 12 are plan and side views, respectively, of a gimbal/slider system having a dithering unit according to a seventh embodiment of the present invention.
Figure 12:
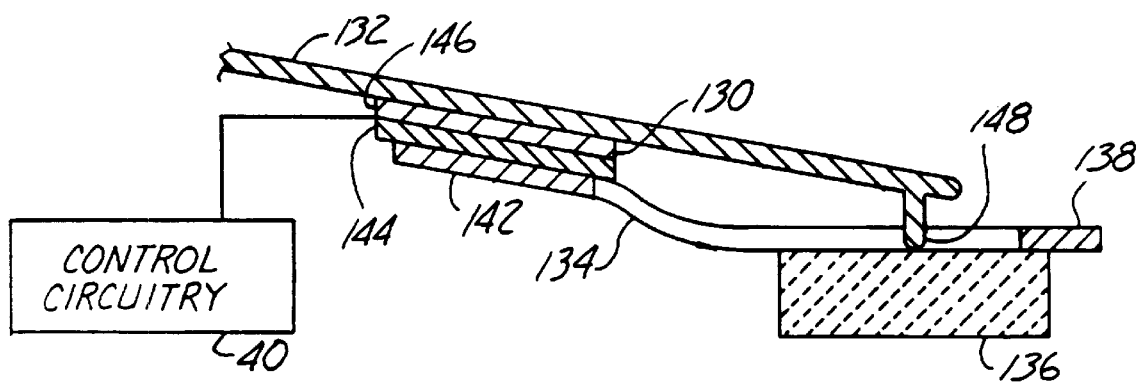

FIGS. 11 and 12 illustrate another embodiment of the present invention employing a linear motor 130 attached between head suspension load beam 132 and gimbal 134, which in turn carries slider 136 connected to tongue portion 138 of gimbal 134 near a distal end of slider 136. Slider 136 carries transducing head 140 near its distal end.

Gimbal 134 is preferably constructed with rectangular portion 142 at a proximal end, and arm portions extending toward a distal end, forming an aperture between the arm portions. Rectangular portion 142 of gimbal 136 is attached to rotor 144 of motor 130, so that linear movement of rotor 144 in the X and/or Y directions effects rigid-body linear movement of gimbal 134 and slider 136. Suspension load beam 132 applies pre-load force to slider 136 at pre-load tip 148 inside the aperture of gimbal 134. Pre-load tip 148 slides across the top surface of slider 136 as movement of slider 136 occurs.

Linear motor 130 is responsive to control signals from control circuitry 40 to linearly expand in the X and/or Y directions to provide two-dimensional movement of slider 136 and transducing head 140. As in the case of the rotary motor in FIGS. 9 and 10, because motor 130 is a discrete component separate from the design of head suspension 132, gimbal 134 and slider 136, any small-scale linear motor technology (many of which are known in the art) may be used. Linear micromotors may operate via parallel plates attached to a fixed stator and a mobile rotor of the motor in opposing pairs. A control signal, such as a voltage, is applied to the pairs of plates to move the rotor with respect to the stator. The motor is preferably configured with parallel plates to cause linear motion in the X direction, and parallel plates configured to cause perpendicular linear motion in the Y direction. The design flexibility of the present invention, which permits the use of several existing micromotor designs, simplifies the design of high-resolution head positioning mechanisms for disc drives.

As described in the aforementioned Boutaghou et al application Ser. No. 08/836,466, motor 130 is operated to finely position head 140 with respect to a selected track. Additionally, by driving microactuator 100 with an alternating signal, such as from supply 40, the microactuator acts as a dithering device and slider 136 can be vibrated to overcome the effects of stiction, without affecting operation of either the disc spindle motor or the actuator arm voice coil motor.

Figure 13:
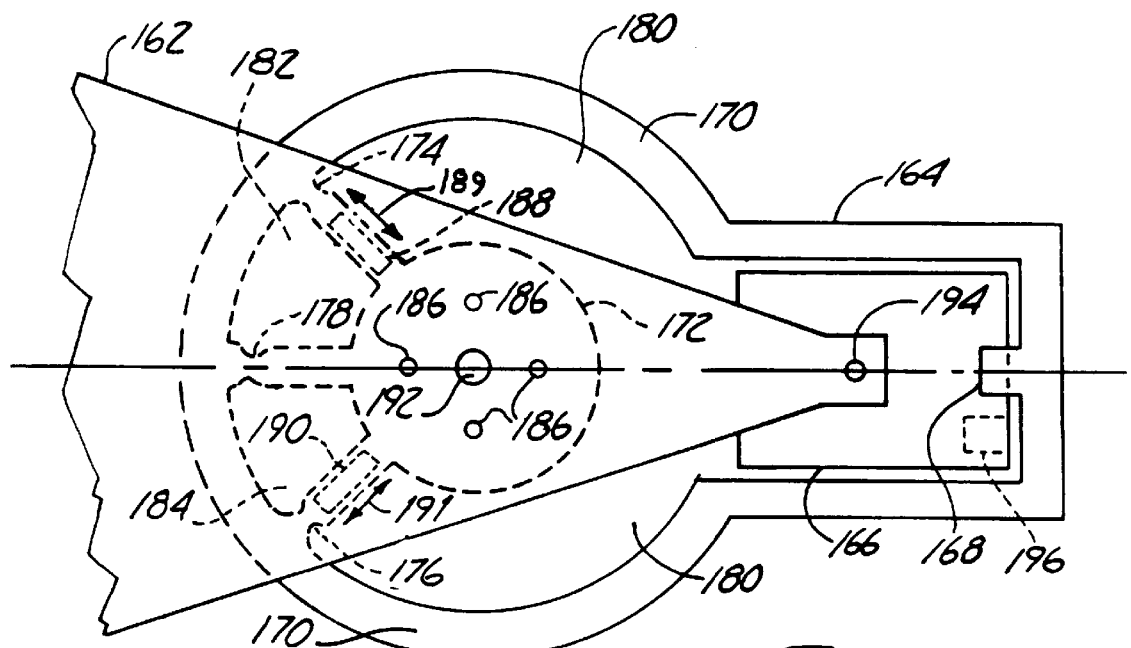
FIGS. 13 and 14 are plan and side views, respectively, of a gimbal/slider system having a dithering unit according to a eighth embodiment of the present invention.
Figure 14:
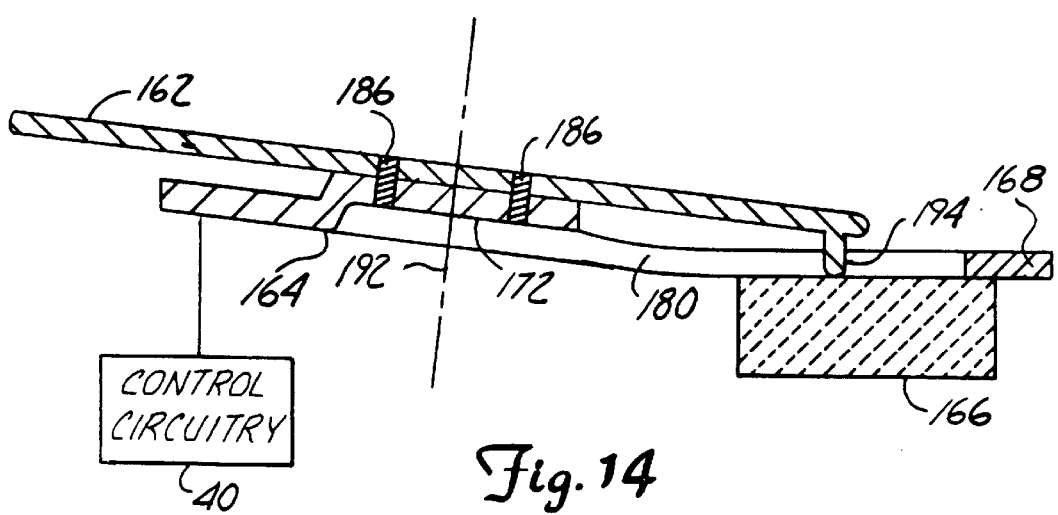

FIGS. 13 and 14 illustrate another embodiment of the present invention employing a small-scale motor 160 between the load beam 162 and gimbal spring 164. Slider 166 is attached to tongue portion 168 of gimbal 164 at a distal end of gimbal 164.

Gimbal 164 is a unitary flexure comprising ring portion 170, anchor disc 172, and hinges 174, 176 and 178 connecting ring 170 to disc 172 and forming openings 180, 182 and 184. Anchor disc 172 is attached to load beam 162 by welds or adhesive at attachment points 186. A pair of piezoelectric elements 188 and 190 are rigidly attached to hinges 174 and 176, respectively, and are actuated by an applied voltage from control circuitry 40 to selectively expand and contract in the direction of arrows 189 and 191, thereby bending hinges 174 and 176, which in turn forces bending of hinge 178. Piezoelectric elements 188 and 190 may be integrally formed, or embedded, into hinges 174 and 176, respectively. The bending of hinges 174, 176 and 178 elastically distorts ring 170 to alter the position of slider 166 with respect to tracks of a magnetic disc. Gimbal 164, and slider 166 mounted thereon, is thereby effectively rotated in an arc about axis 192 of anchor disc 172. Suspension load beam 162 applies pre-load force to slider 166 at pre-load tip 194. Pre-load tip 194 slides across the top surface of slider 166 as movement of slider 166 occurs.

Piezoelectric elements 188 and 190 are oppositely actuated in response to an applied voltage, so that they act as a complementary pair to distort gimbal 174 in a common direction. In this embodiment, integration with gimbal 164 is achieved, although the nature and stiffness of gimbal 164 is not affected.

As described in the aforementioned Boutaghou et al application Ser. No. 08/836,466, motor 172 is operated to finely position head 196 on slider 166 with respect to a selected track. Additionally, by driving microactuator 172 with an alternating signal, such as from supply 40, the microactuator acts as a dithering device so that slider 166 can be vibrated to overcome the effects of stiction, without affecting operation of either the disc spindle motor or the actuator arm voice coil motor.

It will be appreciated that the dither device of the present invention may be placed at any convenient location in the actuator arm assembly, such as in the E-block body, in the actuator arm or at the connection of the slider to the gimbal, all as described herein Any microactuation device for fine positioning the slider with respect to a selected track, as described in the aforementioned Mohajerani et al. and Boutaghou et al. applications may be used for dithering according to the present invention. Additionally, the dither device may be placed at any convenient location in the actuator arm assembly, such as at the connection between the load beam and the gimbal, as in Boutaghou et al. application Ser. No. 08/836,466, or in a fixture designed for inclusion in the actuator arm assembly, as in Hawwa et al. application Ser. No. 08/836,205, which are assigned to the same Assignee as the present application and are incorporated herein by reference.

It will also be appreciated by those skilled in the art that while the microactuator is described herein as a piezoelectric actuator, other forms of microactuator motor may be employed to provide microvibration as herein described. For example, other microactuator motors that could be employed in place of a piezoelectric microactuator has herein described include electromagnetic, electrostatic, capacitive, fluidic and thermal motors.

Although the present invention has been described with reference to preferred embodiments, workers skilled in the art will recognize that changes may be made in form and detail without departing from the spirit and scope of the invention.

What is claimed is:

1. A disc drive having rotatable recording disc and an actuator arm system that includes a transducing head on a slider arranged to fly over a surface of the disc when the disc is rotated, a motor coupled to the actuator arm system to position the transducing head over a selected track of the disc, the slider being arranged to land on the disc surface when the disc is not rotated, the disc drive including dithering means supported on the actuator arm system for vibrating the slider in a direction generally radially across the disc when the slider is on the disc surface to reduce stiction between the slider and the disc surface.

2. The disc drive of claim 1, wherein the dithering means includes
   a microactuator, and
   a voltage supply for operating the microactuator at a design frequency.

3. The disc drive of claim 2, wherein the design frequency is between 1 and 30,000 Hertz.

4. The disc drive of claim 2, wherein the microactuator includes a piezoelectric element.

5. The disc drive of claim 2, wherein the actuator arm system includes an actuator arm having first and second arm side portions on opposite sides of a longitudinal axis of the actuator arm forming a space on the longitudinal axis, and the microactuator is on the first side portion of the actuator arm.

6. The disc drive of claim 5, including a relief machined in the second side portion of the actuator arm.

7. The disc drive of claim 5, wherein the microactuator includes
   a piezoelectric element supported on the first side portion of the actuator arm; and
   a voltage supply for operating the piezoelectric element at a design frequency.

8. The disc drive of claim 7, further includes an additional piezoelectric element in the second side portion configured complementary to the piezoelectric element in the first side portion.

9. The disc drive of claim 2, wherein the actuator arm system includes
   a gimbal,
   the slider being supported by the gimbal, and
   the microactuator being connected between the gimbal and the slider to radially vibrate the slider relative to the gimbal.

10. The disc drive of claim 9, wherein the gimbal includes a tab, the microactuator being mounted to the tab and the slider being mounted to the microactuator.

11. The disc drive of claim 2, wherein the actuator arm system includes
    a load beam supporting a gimbal, the slider being supported by the gimbal, and
    the microactuator being connected between the load beam and the gimbal to radially vibrate the gimbal and the slider relative to the load beam.

12. The disc drive of claim 11, wherein the microactuator is connected between the load beam and the gimbal and is supported by the load beam to support the gimbal.

13. The disc drive of claim 12, wherein the microactuator is a rotary motor.

14. The disc drive of claim 12, wherein the microactuator is an X-Y actuator.

15. The disc drive of claim 2, wherein the actuator arm system includes
    a load beam, a gimbal having an anchor disc mounted to the load beam, a flexure supporting the slider, and a plurality of hinges supporting the flexure to the anchor disc, and the microactuator being connected to at least one of the hinges to distort the flexure with respect to the anchor disc to thereby radially vibrate the flexure and the slider relative to the load beam.

16. In a positioning system for positioning a transducing head over a selected track on a surface of a rotating disc in a disc drive, the positioning system including an actuator arm movable about an actuator arm axis, a head suspension mechanism connected to an end of the actuator arm, and a slider connected to the head suspension mechanism and supporting the transducing head, the actuator arm being operatively coupled to a motor that moves the actuator arm about the actuator arm axis to radially position the head relative to the disc axis, the slider being operable to land on the disc surface, the improvement comprising:

dithering means supported on the positioning system for radially vibrating the slider when the slider is landed on the disc to reduce stiction between the slider and the disc surface.

17. The positioning system of claim 16, wherein the dithering means includes a microactuator; and a voltage supply for operating the microactuator at a design frequency.

18. The positioning system of claim 17, wherein the design frequency is between 1 and 30,000 Hertz.

19. The positioning system of claim 17, wherein the microactuator includes a piezoelectric element.

20. The positioning system of claim 17, wherein the actuator arm includes first and second arm side portions on opposite sides of a longitudinal axis of the actuator arm forming a space on the longitudinal axis, and the microactuator is on the first side portion of the actuator arm.

21. The positioning system of claim 20, including a relief machined in the second side portion of the actuator arm.

22. The positioning system of claim 20, wherein the dithering means includes a piezoelectric element supported on the first side portion of the actuator arm; and a voltage supply for operating the piezoelectric element at a design frequency.

23. The positioning system of claim 22, further includes an additional piezoelectric element in the second side portion configured complementary to the piezoelectric element in the first side portion.

24. The positioning of claim 17, wherein the actuator arm system includes a gimbal, the slider being supported by the gimbal, and the microactuator being connected between the gimbal and the slider to radially vibrate the slider relative to the gimbal.

25. The positioning system of claim 24, wherein the gimbal includes a tab, the microactuator being mounted to the tab and the slider being mounted to the microactuator.

26. The positioning system of claim 17, wherein the actuator arm includes a load beam supporting a gimbal, the slider being supported by the gimbal, and the microactuator being connected between the load beam and the gimbal to radially vibrate the gimbal and the slider relative to the load beam.

27. The positioning system of claim 26, wherein the microactuator is connected between the load beam and the gimbal and is supported by the load beam to support the gimbal.

28. The positioning system of claim 27, wherein the microactuator is a rotary motor.

29. The positioning system of claim 27, wherein the microactuator is an X-Y actuator.

30. The positioning system of claim 17, wherein the actuator arm includes a load beam, a gimbal having an anchor disc mounted to the load beam, a flexure supporting the slider, and a plurality of hinges supporting the flexure to the anchor disc, and the microactuator being connected to at least one of the hinges to distort the flexure with respect to the anchor disc to thereby vibrate the flexure and the slider relative to the load beam.

31. A method of starting rotation of a rotatable disc of a disc drive which has a spindle motor for rotating the disc at an operational velocity and an actuator arm assembly that includes a slider carrying a transducing head, the actuator arm assembly being operable to position the head at a selected radial location on the disc, wherein the slider has an air bearing surface in contact with the disc when the disc is not rotated, the air bearing surface being arranged to support the slider in flying relation to the disc when the disc is rotated at the operational velocity, the method comprising:

supporting a microactuator on the actuator arm assembly, operating the microactuator to radially vibrate the slider when the slider is on the disc surface to reduce stiction between the slider and the disc surface, and operating the spindle motor.

32. The method of claim 31, wherein the microactuator is operated at a frequency between about 1 and 30,000 Hertz.

* * * * *

UNITED STATES PATENT AND TRADEMARK OFFICE
CERTIFICATE OF CORRECTION

PATENT NO. : 6,002,549
DATED : December 14, 1999
INVENTOR(S) : Alan David Berman et al.

It is certified that error appears in the above-identified patent and that said Letters Patent is hereby corrected as shown below:

<u>Title page,</u>
Item [54], delete "MICROACTORS", insert -- MICROACTUATORS --

<u>Column 9,</u>
Line 53, delete "08/836,205", insert -- 08/836,265 --

Signed and Sealed this

Sixteenth Day of October, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.   : 6,002,549  
DATED        : December 14, 1999  
INVENTOR(S)  : Alan David Berman et al.

Page 1 of 1

It is certified that error appears in the above-identified patent and that said Letters Patent is hereby corrected as shown below:

<u>Column 11,</u>  
Line 51, delete "The positioning of claim 17, wherein the actuator arm system includes", insert -- The positioning system of claim 17, wherein the actuator arm includes --

Signed and Sealed this

Twentieth Day of August, 2002

Attest:

JAMES E. ROGAN  
Attesting Officer      Director of the United States Patent and Trademark Office